United States Patent [19]
Porta et al.

[11] 3,973,791
[45] Aug. 10, 1976

[54] SAFETY COUPLING DEVICE

[75] Inventors: Frank L. Porta; Frank T. Porta, both of Elkview, W. Va.

[73] Assignee: HPS Company, Inc., Charleston, W. Va.

[22] Filed: Oct. 9, 1974

[21] Appl. No.: 513,478

[52] U.S. Cl. .................................. 285/305; 285/174; 285/347; 285/351
[51] Int. Cl.² ........................................ F16L 37/06
[58] Field of Search ................... 285/305, 1, 347, 2, 285/351, 93, 95, 35, 174

[56] References Cited
UNITED STATES PATENTS

| | | | |
|---|---|---|---|
| 2,772,898 | 12/1956 | Seeler | 285/351 X |
| 2,914,344 | 11/1959 | Anthes | 285/351 X |
| 3,527,485 | 9/1970 | Goward et al. | 285/305 |

*Primary Examiner*—Dave W. Arola
*Attorney, Agent, or Firm*—Pennie & Edmonds

[57] ABSTRACT

A coupling device adapted for connecting conduits or the like which carry pressurized fluid and essentially embodies first and second coupling members, a pair of sealing members and retaining means. The first coupling member is arranged to be connected to the conduit and includes first and second spaced generally peripheral grooves, each of which is defined by respective first and second pairs of shoulders, and a peripheral depression formed adjacent one of the second pair of shoulders remote from the first groove. The pair of sealing elements are arranged such that respective ones thereof are suitably received within the first and second grooves for providing a fluid-tight seal. The second coupling member detachably receives the first coupling member and includes at least first and second bores which respectively slidably receive the first and second sealing members, and first and second openings which extend generally transversely to the longitudinal axis of the first and second bores. Such first and second openings are arranged adjacent to and in open communication with opposite sides of the peripheral depression formed on the first coupling member. The retaining means includes a pair of retaining members, each of which is respectively adapted to frictionally cooperate with the first and second openings and with the peripheral depression so as to interlock the first and second coupling members together, and for deforming the one shoulder formed adjacent the peripheral depression such that the first coupling member may not be slidably received by the first and second bores.

6 Claims, 5 Drawing Figures

SAFETY COUPLING DEVICE

BACKGROUND OF THE INVENTION

1. Field of the Invention

The present invention is directed to couplings for detachably connecting a first member to a second member. More particularly, it pertains to a novel and improved quick-disconnect type of safety coupling device particularly useful for fluidic type applications or the like.

2. Description of the Prior Art

It is conventional in the field of couplings to detachably interconnect a first coupling member to a second coupling or manifold member adapted to receive the first coupling member. One such type of coupling, which is particularly adapted for use in fluidic type applications that are subject to fluidic pressures, may include a single O-ring associated with a first or male coupling member. However, through experience, it has been determined that a single O-ring, even in some low pressure hydraulic systems, does not provide sufficient sealing qualities necessary to prevent leakage. Accordingly, the coupling is rendered ineffective for the purposes intended. Attempts, to improve upon such of the noted types of couplings include a coupling device which may comprise a generally elongated hose having a male coupling member connected thereto with a pair of O-rings longitudinally spaced from each other, an interfitting female or manifold member for snugly receiving the male coupling member and a generally U-shaped retaining pin having a pair of retaining legs, each of which cooperates with the female and male coupling members to firmly interconnect the two coupling members together. While this last particular type of coupling is generally suitable for fluid handling situations, it does not, on the other hand, have any provisions for rendering ineffective a male coupling member and attached hose for future use. This latter shortcoming may provide for potentially dangerous conditions in the field. Such dangerous conditions may arise whenever a fluid type fitting has been subjected to relatively excessive pressures. If such excessive pressures exist, there is a tendency for the hydraulic hose and male coupling member being operatively connected to the female member or the like to strike against the female member. Under such conditions, the male coupling member may become damaged to the point that it is no longer adequate for rendering adequate future use. However, the fact that such hose and coupling member are damaged may not be readily apparent to a worker in the field. Accordingly, the generally defective male coupling and hose members may be subsequently reused under similar operating conditions which led to its initial failure. Whenever so reapplied, it at once becomes apparent that such fluid coupling would again be subject to a similar failure with the consequent result that damage and injury to persons and/or property may ensue.

Yet another shortcoming which may also be experienced by such prior art types of couplings subjected to relatively high fluidic pressures is the tendency of the hydraulic hose and the associated male coupling member to be forced against the female coupling or manifold member. Such action will normally serve to damage the female manifold member to the extent such that it might not provide for a suitable fluid-tight fit in future applications. Accordingly, the female manifold member of the fluid coupling would be rendered ineffective to perform its intended operation.

SUMMARY OF THE INVENTION

Accordingly, therefore, the present invention is directed to overcoming the aforementioned shortcomings and disadvantages associated with prior art types of couplings, by providing a novel and improved safety coupling device which is particularly adaptable and successful for providing a compact quick-disconnect safety coupling device which not only more positively interlocks and seals a male coupling member to a female coupling member, but also provides a safety coupling which prevents the dangerous future use of damaged male coupling members as well as damage to female coupling members.

Briefly stated, the safety coupling device contemplated for use in the present invention essentially includes first and second coupling members, a pair of sealing members, and a retaining pin. The first coupling member is adapted to be connected to a suitable conduit which may carry pressurized fluid, and includes at least first and second spaced and generally peripheral grooves, each of which is defined by respective first and second pairs of shoulders, and a peripheral depression formed adjacent one of the second pair of shoulders which is remotely situated with respect to the first groove. The pair of sealing members may be comprised by a pair of elastomeric O-rings, respectively, received within the first and second grooves for sealing against leakage of pressurized fluid. The second coupling member is adapted to receive the first coupling member and includes, at least, first and second bores which slidably receive the first and second sealing elements. In addition, the second coupling member is provided with first and second openings which extend in a generally transverse direction relative to the longitudinal axis of the first and second bores and are so arranged adjacent to and in open communication with the opposite sides of the peripheral depression whenever the first and second coupling members are assembled. The retaining pin may include a generally U-shaped pin having a pair of retaining leg members. Each of the leg members is respectively adapted to frictionally cooperate with the first and second openings as well as with the peripheral depression so as to interlock the first coupling member to the second coupling member. In addition, the retaining leg members serve to deform or shear the noted one shoulder of the second pair of shoulders whenever a predetermined proportion of the burst pressure has been reached, such that the second groove is partially deformed and the O-ring therein is further distorted.

BRIEF DESCRIPTION OF THE DRAWINGS

These and other objects, features, and advantages of the present invention will become apparent upon a reading of a detailed description of a preferred embodiment thereof when viewed in conjunction with the accompanying drawings wherein like reference numeral indicate like structure throughout the several views.

DESCRIPTION OF A PREFERRED EMBODIMENT

Figure 1:
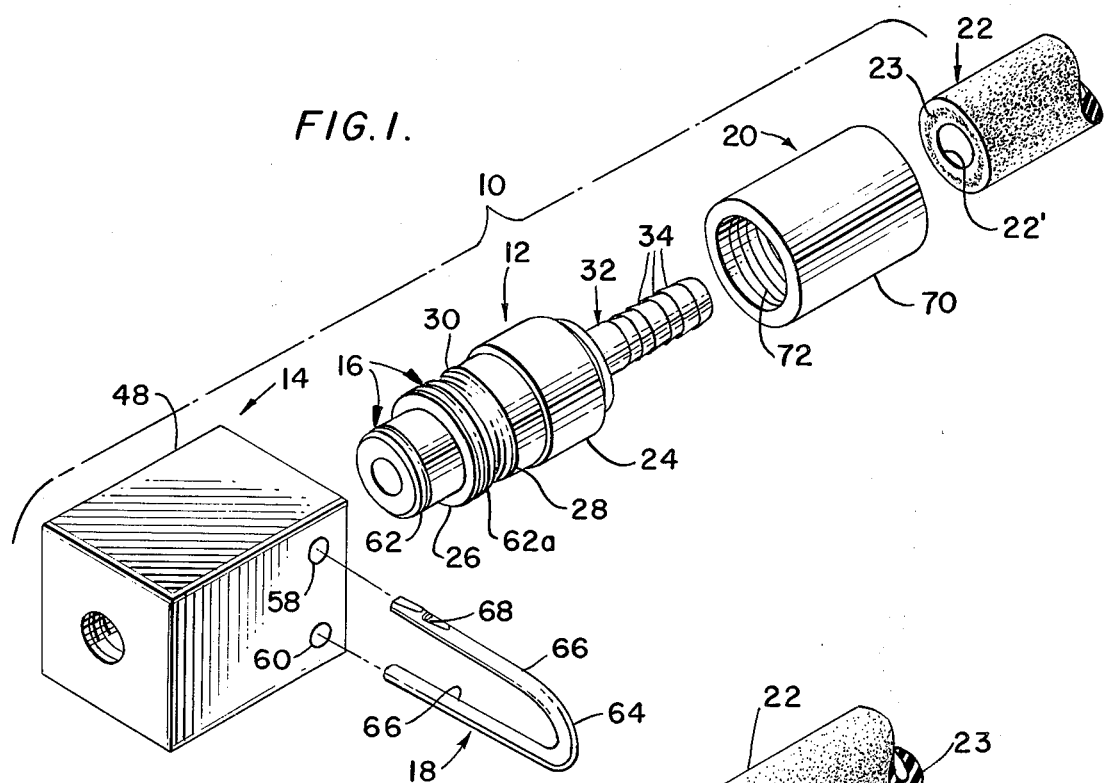
FIG. 1 is an exploded perspective view of the components forming the improved safety coupling device embodying the principles of the present invention.

Referring now to the Figures of the drawing there is disclosed a novel and improved safety coupling device embodying principles of the present invention and generally designated by reference numeral 10. Such safety coupling device 10 is particularly adapted for use in fluid handling operations, especially wherein relatively high fluidic pressures are experienced. Basically, it includes a first or male coupling member 12, a second or female coupling member 14, sealing means 16, a retaining means 18, and a connection means 20 which serves to interconnect the male coupling member 12 to a conventional hydraulic hose or conduit 22 having an opening 22' and metallic wire reinforcement braids 23, in a manner to be more fully described.

Figure 3:
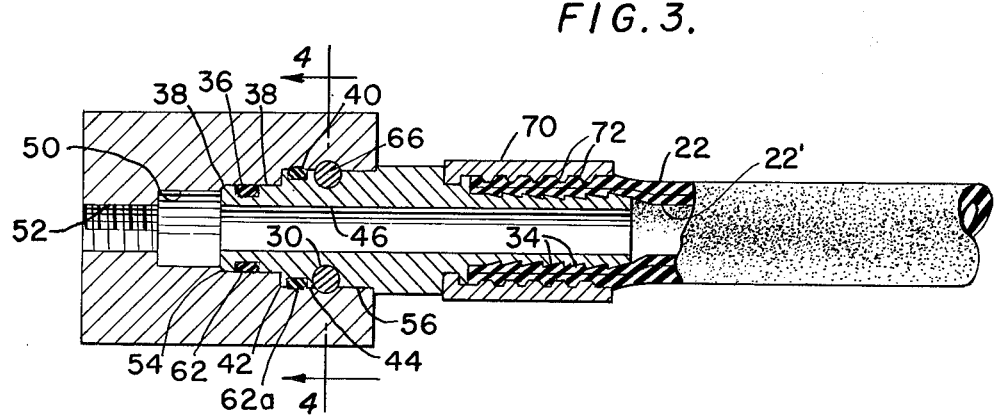
FIG. 3 is a sectional side elevational view taken substantially along section line 3—3 in FIG. 2 looking in the direction of the arrows and illustrating in somewhat greater detail the relationship of the various components when in the assembled condition.
Figure 5:
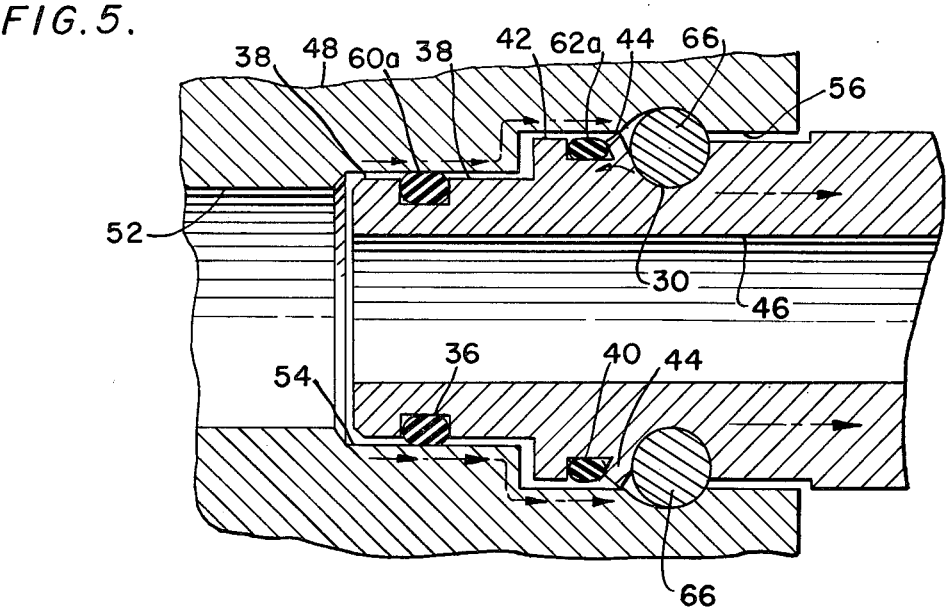

With reference to FIG. 1 taken in conjunction with FIGS. 3 and 5 the male coupling member 12 is seen as having a generally cylindrical configuration and is made of a suitable material having an appropriate hardness. The particular significance of such hardness will be subsequently discussed in the succeeding description of the present invention. Although in the preferred embodiment, the male coupling member 12 has taken a generally cylindrical configuration it is within the spirit and scope of the present invention that other similar types of configurations may be effectively used. Male coupling member 12 includes a generally elongated and cylindrical main body section 24 having located at the forward end thereof a first reduced diameter portion 26 and a second reduced diameter portion 28. The first diameter portion 26 is of a dimension smaller than that of the second reduced portion. Both the first and second reduced portions 26 and 28, respectively, may be formed to be coaxial with the longitudinal axis of the first coupling member 12. Formed on the second reduced portion 28 is a relatively enlarged peripheral depression 30, the significance of which will be afterwards made clear in the description of the preferred embodiment. Rearwardly extending from the main body portion 24 is a connection portion 32 which may, preferably, include a plurality of serially arranged flared sections or projections 34 which are adapted to fit within the opening 22' formed in conduit 22, such as shown in FIG. 3. Suitably formed on the first reduced portion 26 is a first generally annular or peripheral groove 36. Such first groove 36 is defined by a first pair of shoulders 38. Also suitably formed on the second reduced portion 28 is a second peripheral or generally annular groove 40. Second groove 40 is defined by a second pair of forward and rearward shoulders 42 and 44, the latter of which is adapted to be deformed by the retaining means 18 in a manner to be presently described. The rearward shoulder 44 is spaced remote from the first annular groove 36 and is formed adjacent the peripheral depression 30. It will be noted that the depth of depression 30 exceeds that of groove 40. In addition, the male coupling member 12 is provided with an elongated passageway 46 which permits pressurized fluid to flow therethrough.

Figure 2:
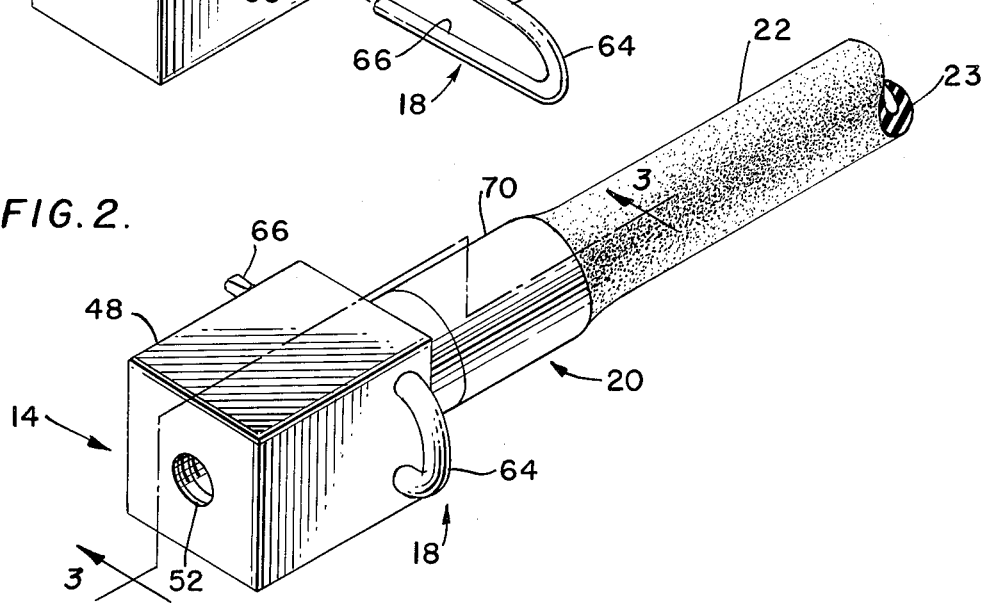
FIG. 2 is a perspective view of the improved safety coupling device of the present invention illustrated in the assembled condition.
Figure 4:
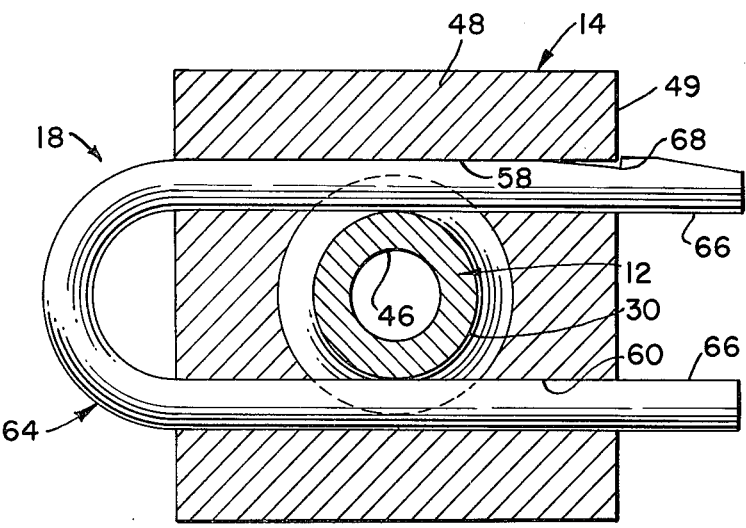
FIG. 4 is a somewhat enlarged sectional view taken substantially along section line 4—4 in FIG. 3 looking in the direction of the arrows and illustrating greater detail of the interlocking relationship; and, FIG. 5 is an enlarged sectional view of the male coupling member illustrating deformation and flaring of one of the shoulders forming a groove on the male coupling member.

As clearly shown in FIG. 1 taken in combination with FIGS. 2 to 4, second or female coupling member 14 may be comprised of a generally block shaped housing member 48 having housing surfaces 49. It is to be understood, of course, that the present invention envisions that other suitable and well known types of housing members may be used for cooperation with the first coupling member 12. Such housing member 48 may include at least first and second passages 50 and 52, respectively, and may be used to interconnect the conduit 22 to a mounting member (not shown) by suitable threaded means or the like. Furthermore, housing member 48 may be provided with additional passages for accomodating other male coupling members 12.

As more particularly shown in FIG. 3, the first passageway 50 is formed with a first bore 54 and a second bore 56 coaxially disposed with respect to the first bore 54 is the second bore 56 which has a diameter exceeding that of the first bore 54. The axes of both bores are coincident with the longitudinal axis of the first passage 50. First and second bores 54 and 56, respectively, are adapted to slidingly receive the first and second grooves 36 and 40, respectively, in a manner such as is shown in FIG. 3.

Specifically referring to FIG. 4, the housing member 48 is formed with generally parallel and separated first and second openings 58 and 60, respectively. The first and second openings 58 and 60 are so arranged to extend generally transversely to the longitudinal axis of the first passageway 50. In addition, the first and second openings 58 and 60 are arranged to extend partially into the second bore 56 in such a manner that whenever the safety coupling device 10 is in the assembled condition, such as is shown in FIGS. 2, 3 and 5, they are in respective open communication with opposed sides of the peripheral depression 30. The particular significance of this relationship is to insure that the retaining means 18 may firmly interlock the first coupling member 12 to the second coupling member 14.

As perhaps best shown in FIGS. 1, 3 and 5 the sealing members 16 of the preferred embodiment may be defined by conventional type elastomeric O-rings 62 and 62a which should be suitable for the pressures the coupling device 10 may experience. Primary O-ring 62 and secondary O-ring 62a are appropriately fitted within the first and second grooves 36 and 40, respectively. In this particular fashion the O-rings 62 and 62a are in sliding and sealing contact with the first and second bores 54 and 56, respectively. The constructional arrangement aforedescribed is able to operate at higher pressures than single O-rings because it creates a differential pressure between primary O-ring 62 and secondary O-ring 62a. Moreover, the secondary or back-up O-ring 62a prevents against seepage of fluid at low pressure and provides a safeguard against immediate system failure due to a defective primary O-ring 62. Additionally, the dual O-rings 62 and 62a serve to trap fluid therebetween.

As clearly shown in FIGS. 1 and 4 the retaining means 18 of the preferred embodiment may be comprised by a generally U-shaped keeper or retaining pin 64 having opposed parallel retaining leg members 66. Retaining leg members 66 are designed to cooperate with the first and second openings 58 and 60 formed in the housing member 48. Formed on one of the retaining leg members 66 is a conventionally shaped retaining notch generally designated by reference numeral 68. Such notch 68, is adapted to cooperate in well-known fashion with one surface 49 of housing member 48 surrounding the first opening 58 to thereby firmly hold the retaining pin 64 to the housing member 48. To facilitate the insertion and removal of retaining pin 64, the generally U-shaped pin is made of an appropriate resilient material which will enable the bending of the retaining leg members 66 towards and away from each other. By virtue of the inherent resiliency of the retaining pin 64, the retaining notch 68 when completely inserted through the housing member 48 will move away from the other retaining leg member 66 and in so doing firmly latch onto the surface 49 of the housing member 48. As aforementioned, since the first and second openings 58 and 60 are in open communication with opposed sides of the peripheral depression 30, whenever the retaining pin 64 is in the assembled condition (FIG. 4) retaining leg members 66 firmly and frictionally cooperate with both the first and second openings and the peripheral depression. Accordingly, a positive interlock will exist between the first and second coupling members 12 and 14, respectively. To quickly disconnect the safety coupling device 10, one merely has to force the biassed retaining leg members 66 towards each other until notch 68 no longer contacts surface 49, thereby permitting the retaining pin 64 to be quickly and easily withdrawn.

The present invention also contemplates that the material selected for the retaining pin 64 be of such a hardness that it at least exceeds that of the hardness of the material forming the first coupling member 12. In having such a constructional arrangement, the material forming the forward and rearward shoulders 42 and 44 which define the second groove 40 may be deformed and flared upon contact with retaining pin 64 such as shown in FIGS. 5 and 6, for purposes hereinafter described. A material for the retaining pin 64 which has been determined to be successful in the operation of the present invention may be fabricated from steel. Such material has been determined to have sufficient hardness but also the necessary resiliency for the leg members 66. With such a material being used for retaining pin 64, it will be understood, of course, that to accomplish such deformation of rearward shoulder 44 the material forming the first coupling member 12, and the shoulder 44 in particular, should be fabricated from a suitable material which has a hardness less than that of the retaining pin 64. A material which has been found to be suitable for such purposes whenever, for example, the retaining pin 64 is made from steel is ledloy 300, or AISI 1042.

As aforementioned, the present invention provides for an improved form of installation and connection between the first coupling member 12, conduit 22 and female coupling member 14. With reference to FIGS. 1 and 3, it will be seen that through use of the retaining pin 64 cooperating with depression 30 a conventionally constructed ferrule 70 having internally formed indentations 72 is capable of effecting a positive and less complex type of connection between the conduit 22, and male and female members 12 and 14, respectively, as opposed to the conventional screw threaded and swivel type coupling devices which are normally used in the field. As more clearly depicted in FIG. 2 taken with FIG. 3 ferrule 70 is arranged about the end of the conduit 22 and the connecting portion 32 of first coupling member 12. By this kind of arrangement, the serially arranged flared portions 34 extend within the opening 22'. With conventional crimping or swaging presses, the ferrule 70 is radially compacted onto the exterior surface of the conduit 22 such that it firmly secures the latter into firm, non-yielding contact with the serially flared portions or projections 34. This particular type of connection between the conduit 22 and the male coupling member 12 has been found to be successful in applications wherein relatively high pressures are to be experienced. If the safety coupling device 10 is to be used in hydraulic systems wherein relatively high pressures are to be experienced, it might be necessary to buff or skive the end of the conduit 22 to the point that the wire braid 23 is exposed, and thereafter have ferrule 70 grip the wire braid when the ferrule is collapsed. Thus, by use of the retaining pin 64 in the fashion aforenoted, the male coupling member 12 and conduit 22 may be easily and economically installed and connected in the field to a female coupling member 14, by a small swage or crimping press.

Having thus described a preferred embodiment of the present invention its mode of operation will be briefly hereinafter set forth. In the assembled condition of the safety coupling device 10, whenever fluid is being conveyed through the conduit 22 and fluid passageway 46, the O-rings 62 and 62a serve to adequately resist against the leakage of pressurized fluid by providing a differential pressure between the respective O-rings. Should any fluid leak past the primary O-ring 62 it will be trapped in the space defined by the two O-rings 62 and 62a. In having a suitably constructed secondary O-ring 62a in the above noted constructional arrangement, the hydraulic system is prevented against immediate failure due to the possibility of a defective primary O-ring 62, by reason of the back-up function served by the secondary ring. Thusly, the safety device 10 provides for an improved sealing arrangement.

In certain occasions high pressure in the hydraulic system may exceed the effective working pressure designed for the particular conduit 22 and coupling device 10. If the actually experienced pressure is appreciably greater than that of the effective working pressure for the particular device, both male and female coupling members 12 and 14, respectively, may become damaged to the point that they are no longer effective for future applications. To provide a margin of safety in cases of such excessive pressures, it is rather customary practice in the industry to provide a safety factor for a particular fluid coupling. That is, design the particular coupling such that it can withstand a predetermined amount of excessive pressure. The safety factor which is used in the field is approximately four times the effective working pressure the coupling is intended to operate at. This new pressure is normally referred to as the minimum burst pressure. Hence, prior art couplings are intended to successfully operate up to the minimum burst pressure. Although such a safety factor is generally suitable, fluid couplings do become damaged at pressures below the so-called minimum burst pressure.

The preferred embodiment of the present invention contemplates that should the minimum burst pressure be exceeded or even a proportionally less amount thereof be exceeded, the male coupling member 12 would be rendered ineffective for future use while the female coupling member 14 is prevented from being damaged. Towards this end, the rearward shoulder 44 whenever forced into the retaining leg members 66, should pressure exceed a predetermined proportional amount of the burst pressure, shoulder 44 will be deformed or sheared so as to partially close off the second groove 40 as well as further distort the secondary O-ring 62a, as shown in the manned indicated in FIG. 5. This deformation of shoulder 44 results from the fact that, as previously noted, the material forming the retaining leg members 66 is harder than that forming shoulder 44. In addition, the rearward shoulder 44 will also flare generally radially outwardly in such a manner as to cause the tolerances between the male coupling member 12 and the female coupling member 14 to become filled. That is, to close the tolerances existing between the shoulder 44 and the second bore 56. Accordingly, subsequent reuse of male coupling member 12 and conduit 22, which both have been subjected to excessive pressures, will be prevented by reason of the fact that the male coupling member 12 will not be able to be reinserted in the female coupling member 14.

As can be appreciated, since some couplings may become damaged at pressures less than the burst pressure, by having the shoulder 44 deform so as to partially fill or close the second groove 40 at a pressure which is a predetermined proportion of the burst pressure an additional safety factor is provided. For purposes of illustration and not limitation the predetermined proportional pressure in one embodiment was approximately 80% of the burst pressure. It should be pointed out also that the ratio of the above mentioned predetermined proportional pressure relative to the burst pressure may be appropriately selected to satisfy a particular design requirement, provided, of course, that the rear shoulder 44 deforms. It is, of course, understood that the relative hardness of the materials is appropriately selected to accomplish such action. Selection of such materials for accomplishing the above action is considered to be well within the purview of one having skill in the art. Consequently, a description of the materials is not deemed pertinent to a discussion of the present invention.

Furthermore, by having the retaining leg members 66 shear or deform the rearward shoulders 44, not only will male coupling member 12 be incapable of subsequent use but also female coupling member 14 will not be damaged and is, therefore, permitted to be reused. Furthermore, by having the retaining pin 64 arranged in the manner above indicated, such pin not only functions to effect the deformation or shearing action as above mentioned, but also firmly secures first and second coupling members 12 and 14 together.

As aforementioned, to effect a quick disconnect of the safety coupling device 10, the retaining leg members 66 are pressed inwardly such that the retaining notch 68 no longer contacts or latches with the surface 49 of housing member 48. Whenever in such condition, the retaining pin 64 may be easily withdrawn from the housing member 48 to thereby facilitate the subsequent withdrawal and separation of the first coupling member 12 with respect to the second coupling member 14.

In applicant's aforenoted arrangement, a safety coupling device 10 is disclosed which can be easily assembled as well as disassembled and which is durable in construction, reliable in operation, and capable of deforming the first coupling member such that it no longer can be used whenever subjected to relatively excessive pressures while at the same time not damaging the second coupling member 14 thereby permitting the latter to be reused.

While the invention has been described in connection with a preferred embodiment, it is not intended to limit the invention to the particular form set forth, but on the contrary, it is intended to cover such alternative modifications and equivalents as may be included within the spirit and scope of the invention defined by the appended claims.

What is claimed is:

1. In a coupling device for connecting a conduit or the like carrying pressurized fluid comprising a first coupling member having first and second spaced generally peripheral grooves, each of which is defined by respective first and second pairs of shoulders and a peripheral depression formed adjacent one shoulder of said second pair of shoulders which is remote from said first groove; a pair of sealing members each of which is respectively received within said first and second grooves for effecting a fluid-tight seal; second coupling member positioned over said first coupling member with a tolerance therebetween and being detachably connected to said first coupling member and having at least first and second bores slidably receiving said first and second sealing members, and first and second openings extending generally transversely to the longitudinal axis of said first and second bores and each being arranged adjacent to and in open communication with an opposite side of said peripheral depression; and retaining means including a pair of retaining members each of which respectively frictionally cooperates with said first and second openings and said peripheral depression to interlock said first and second coupling members together, and which deforms at least a portion of said one shoulder so as to flare generally radially outwardly into frictional engagement with said second bore to close the tolerance between said one shoulder and at least a portion of said second bore, said second bore being dimensioned to enable said frictional engagement, whenever at least a predetermined proportion of a burst pressure is reached such that said first coupling member may not be slidably received by said first and second bores for enabling interlocking of said first and second coupling members by said retaining means whenever said first coupling is attempted to be reinserted in said second bore.

2. A coupling device as set forth in claim 1 in which said retaining means is defined by a generally U-shaped retaining pin having a pair of first and second retaining leg members received within respective ones of said first and second openings, said retaining pin being made of a material which is resilient and possesses a hardness which exceeds that of the material forming said second pair of shoulders on said first coupling member.

3. A coupling device as set forth in claim 2 in which one of said retaining leg members is formed with a notch which latches onto a surface of said second coupling member so as to facilitate a more positive interlock between said first and second coupling members.

4. In a coupling device for connecting a conduit or the like carrying pressurized fluid comprising a first coupling member having first and second spaced generally peripheral grooves, each of which is defined by respective first and second pairs of shoulders and a peripheral depression formed adjacent one shoulder of said second pair of shoulders which is remote from said first groove; a pair of sealing members each of which is respectively received within said first and second grooves for effecting a fluid-tight seal; second coupling member positioned over said first coupling member with a tolerance therebetween and being detachably connected to said first coupling member and having at least first and second bores slidably receiving said first and second sealing members, and first and second openings extending generally transversely to the longitudinal axis of said first and second bores and each being arranged adjacent to and in open communication with an opposite side of said peripheral depression; and retaining means including a pair of retaining members each of which respectively frictionally cooperates with said first and second openings and said peripheral depression to interlock said first and second coupling members together and which deforms at least said one shoulder so as to flare generally radially outwardly into frictional engagement with said second bore to close the tolerance between said one shoulder and a portion of said second bore, said second bore being dimensioned to enable said frictional engagement, whenever a predetermined proportion of a predetermined burst pressure for said coupling device is reached such that said first coupling member may not be slidably received by said first and second bores for enabling interlocking of said first and second coupling members by said retaining means, whenever said first coupling member is attempted to be reinserted in said first and second bores, said retaining means being defined by a generally U-shaped retaining pin having a pair of first and second retaining leg members received within respective ones of said first and second openings, said retaining pin being made of a material which is resilient and possesses a hardness which exceeds that of the material forming said second pair of shoulders on said first coupling member.

5. In a coupling device for connecting a conduit or the like carrying pressurized fluid comprising a first coupling member having first and second spaced generally peripheral grooves, each of which is defined by respective first and second pairs of shoulders and a peripheral depression formed adjacent one shoulder of said second pair of shoulders which is remote from said first groove; a pair of sealing members each of which is respectively received within said first and second grooves for effecting a fluid-tight seal; second coupling member positioned over said first coupling member with a tolerance therebetween and being detachably connected to said first coupling member and having at least first and second bores slidably receiving said first and second sealing members, and first and second openings extending generally transversely to the longitudinal axis of said first and second bores and each being arranged adjacent to and in open communication with an opposite side of said peripheral depression; and retaining means including a pair of retaining members each of which respectively frictionally cooperates with said first and second openings and said peripheral depression to interlock said first and second coupling members together and which deforms at least said one shoulder so as to flare generally radially outwardly into frictional engagement with said second bore to close the tolerance between said one shoulder and said second bore, said second bore being dimensioned to enable said frictional engagement, and to partially close said second groove and to further distort said sealing member in said second groove, whenever a pressure which is a predetermined porportion of a burst pressure for said coupling device is reached such that said first coupling member may not be slidably received by said first and second bores for enabling interlocking of said first and second coupling members by said retaining means whenever said first coupling member is attempted to be reinserted in said first and second bores after having been separated from said second coupling member.

6. In a coupling device for connecting a conduit or the like carrying pressurized fluid comprising a first coupling member having at least a first generally peripheral groove which is defined by a first pair of shoulders, and a peripheral depression formed adjacent one shoulder of said first pair of shoulders which is remote from said first groove; a sealing member which is received within said first groove for effecting a fluid-tight seal; second coupling member positioned over said first coupling member with a tolerance therebetween and being detachably connected to said first coupling member and having at least a first bore slidably receiving said first sealing member, and first and second openings extending generally transversely to the longitudinal axis of said first bore and each being arranged adjacent to and in open communication with opposite sides of said peripheral depression; and retaining means including a pair of retaining members each of which respectively frictionally cooperates with said first and second openings and said peripheral depression to interlock said first and second coupling members together and which deforms at least said one shoulder so that said one shoulder flares generally radially outwardly into frictional engagement with said first bore to close the tolerance between said one shoulder and at least a portion of said first bore, said first bore being dimensioned to enable said frictional engagement, whenever at least a predetermined proportion of a burst pressure is reached such that said first coupling member may not be slidably received by said first bore for enabling interlocking of said first and second coupling members by said retaining means whenever said first coupling member is attempted to be reinserted therein.

* * * * *